United States Patent [19]

Ido

[11] Patent Number: 4,636,877
[45] Date of Patent: Jan. 13, 1987

[54] APPARATUS FOR REPRODUCING MULTIPLE TRACK DIGITAL SIGNALS AND INCLUDING TIMING CONTROL OF READ/WRITE OPERATIONS

[75] Inventor: Kihei Ido, Kyoto, Japan

[73] Assignee: Mitsubishi Denki Kabushiki Kaisha, Tokyo, Japan

[21] Appl. No.: 674,926

[22] PCT Filed: May 15, 1984

[86] PCT No.: PCT/JP84/00242
§ 371 Date: Nov. 7, 1984
§ 102(e) Date: Nov. 7, 1984

[87] PCT Pub. No.: WO84/04622
PCT Pub. Date: Nov. 22, 1984

[30] Foreign Application Priority Data

May 16, 1983 [JP] Japan ................. 85409/84

[51] Int. Cl.[4] .......................... G11B 5/02; G11B 5/09
[52] U.S. Cl. ........................................ 360/51; 360/22; 360/23
[58] Field of Search ............................. 360/51, 22, 23

[56] References Cited

U.S. PATENT DOCUMENTS 3,982,277  9/1976  Naylor ........................ 360/51 X
4,127,878  11/1978  Johnson, Jr. et al. ........ 360/51
4,215,430  7/1980  Johnson, Jr. .................. 360/51 X

FOREIGN PATENT DOCUMENTS 55-97016  1/1980  Japan .
56-137520  10/1981  Japan .
2111804  7/1983  United Kingdom .

OTHER PUBLICATIONS

Stremler-Introduction to Communications, Addison Wesley Pub., Dec. 1982, pp. 395, 403-405.

Primary Examiner—Robert L. Richardson
Assistant Examiner—Alyssa H. Bowler
Attorney, Agent, or Firm—Bernard, Rothwell & Brown

[57] ABSTRACT

An apparatus for reproducing digital signals on a multi-track recording medium, wherein a signal to be written in a memory is selected from among signals of each track demodulator a demodulation means (50) by a writing track selection circuit (200), the signal of the writing track selected by the track selection circuit (200) is stored in a memory (102), the timing of writing the signal of the selected track is determined by a write timing setup circuit (300), and the timing of reading is determined by a read setup circuit (400) so that the signal stored in the memory (102) is read out during two write timing periods set by the write timing setup circuit (300), and the memory (102) is directed for writing or reading selectively by a read/write selector (100) in accordance with the output signals from the write timing setup circuit (300) and read setup circuit (400), so that writing or reading takes place at an interval of 1/2ANfc.

1 Claim, 6 Drawing Figures

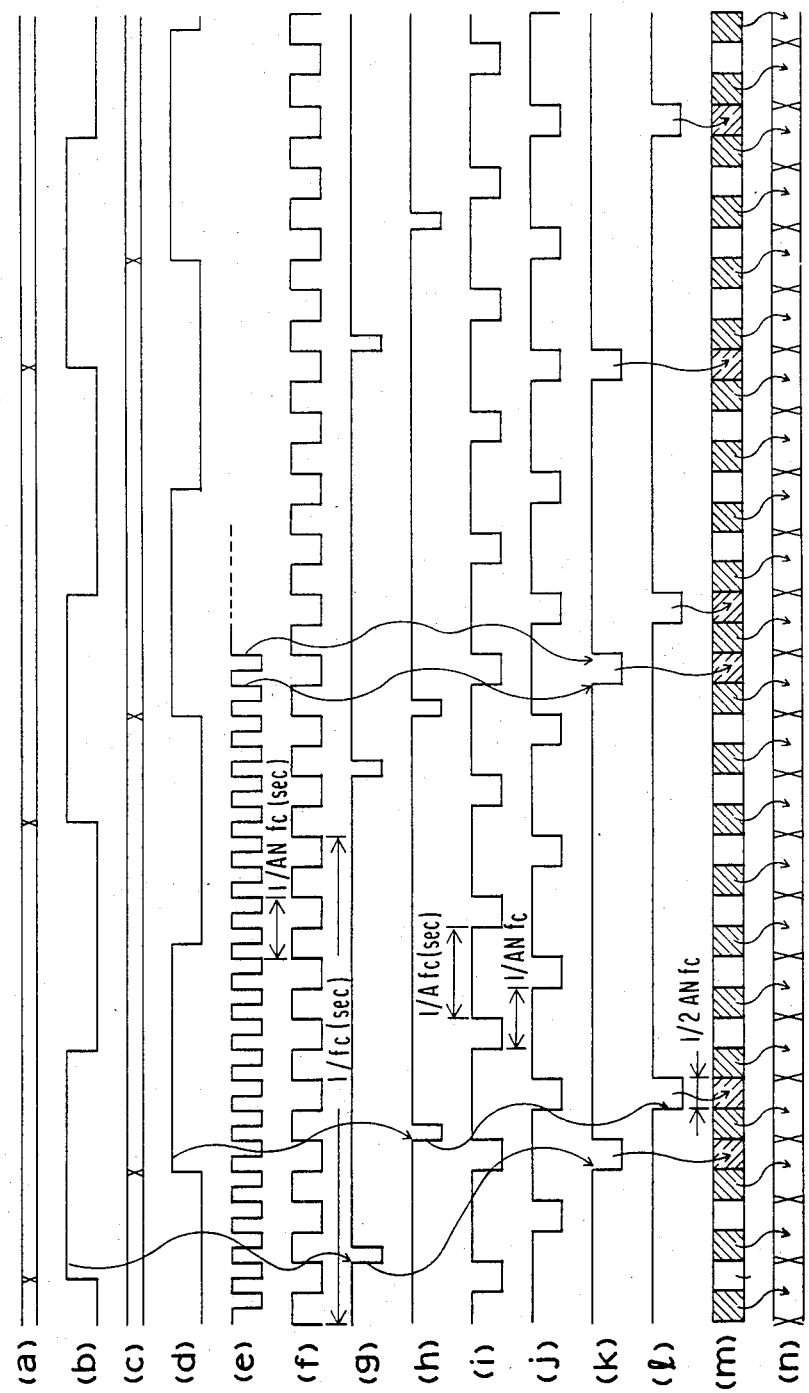

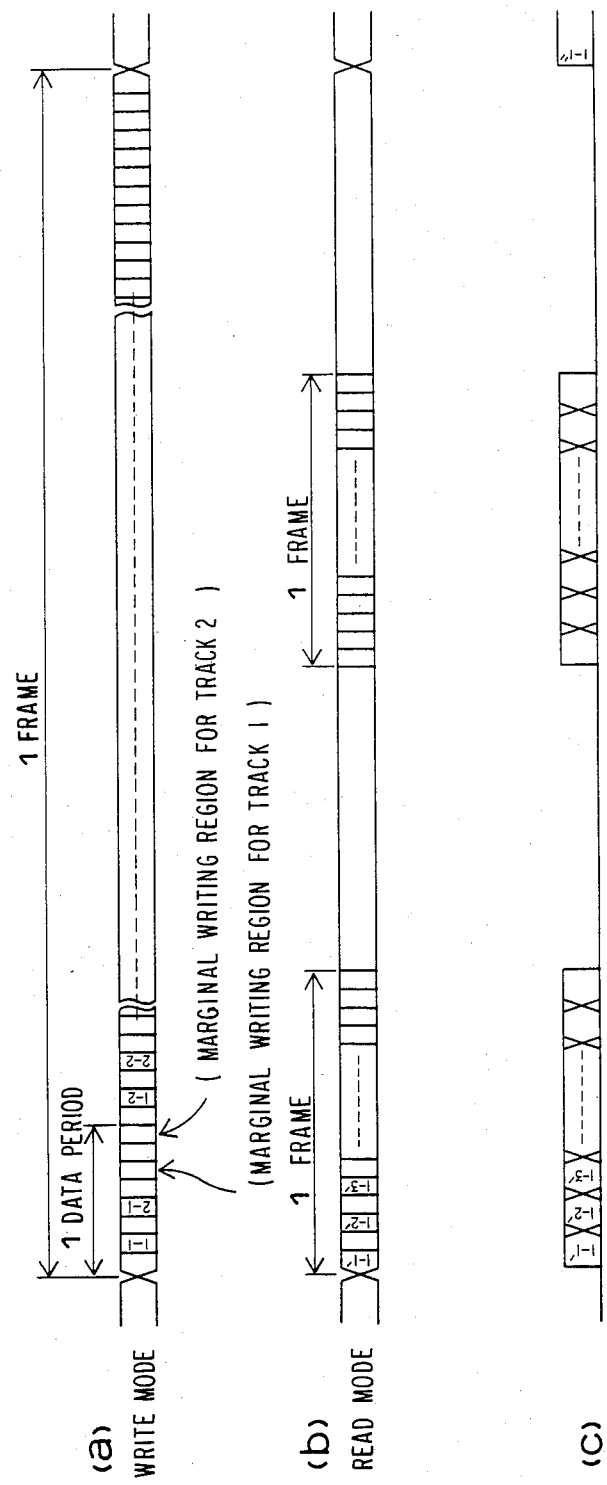

APPARATUS FOR REPRODUCING MULTIPLE TRACK DIGITAL SIGNALS AND INCLUDING TIMING CONTROL OF READ/WRITE OPERATIONS

FIELD OF ART

The present invention relates to a multi-track digital processing apparatus and, particularly, to a multi-track digital signal reproducing apparatus.

BACKGROUND TECHNOLOGY

Generally, a system including a multi-track digital signal reproducing apparatus is arranged as shown in FIG. 1. In the figure, the analog signal reproduced by a reproduction head RH of each track is amplified by a reproduction amplifier RA to have a sufficient voltage level needed for binary conversion, and then converted into binary data by a data detection circuit DD. Thereafter, the binary data in the form of digital modulation for the purpose of digital recording is demodulated back to the original binary data by a demodulator DM. Then, the serial binary data is converted into parallel data by a serial-to-parallel converter S/P, and after the data of each track has been subjected to error correction by an error corrector CC, it is converted back to the original analog signal by a D/A converter and sent out from the system. In FIG. 1, the arrows marked by "//" represent multiple signal lines, and the remaining arrows represent single signal lines.

The serial-to-parallel converter S/P is generally designed so that the variation in the bit rate of reproduced data caused by the variation of the tape speed is modified. One example of the demodulator DM and serial-to-parallel converte S/P in FIG. 1 is disclosed, for example, in Japanese Patent Application Laid-open No. 57-135413, and this is shown in FIG. 2. The arrangement shown in the figure includes a reproduction circuit 10, a PLL reproduction clock circuit 12, a demodulation circuit 14, a write address counter 20, memories 22, 24 and 26, multiplexers 28, 30, 32, 34 and 44, a read address counter 38, a read frame address counter 40, and a track selection counter 46.

In FIG. 2, the reproduction circuit 10 digitizes the signal reproduced by the magnetic head. The PLL reproduction clock circuit 12 reproduces the clock which is in synchronism with the reproduced signal. The demodulation circuit 14 retrieves the original digital data from data digitized by the reproduction circuit 10. The frame synchronizing signal is detected in the demodulated data. The demodulated data and frame synchronizing signal are sent out over the lines 16 and 18, respectively.

The write address counter 20 produces address data based on the reproduced clock, and specifies the write address of the timing correction memories 22, 24 and 26. The multiplexers 28, 30 and 32 specify the read/write mode and switch the address specification accordingly. The read address counter 38 produces the reading address based on the reference clock with extremely small timing variation received on the line 36. The frame address counter 40 generates the frame address.

In the case of a multi-track system, block 48 including the above-mentioned components referred to by numerals 10 through 32 is needed corresponding to each track as shown simply by blocks 48a, 48b and 48c. Outputs 42, 42a, 42b and 42c from the respective tracks are fed to the track switching multiplexer 44. A track to be read is designated by the track read counter 46.

The operation of the foregoing arrangement will be described in the following. The multiplexers 28, 30 and 32 set up the respective memories in write or read mode in response to the frame synchronizing signals provided by the demodulation circuit 14. As shown in FIG. 3, the Nth frame synchronizing signal sets up the memories 24 and 26 in read mode, and the memory 22 in write mode. Subsequently, the N+1st frame synchronizing signal sets up the memory 24 in write mode, and the memory 26 in read mode. Next, the N+2nd frame synchronizing signal sets up the memories 22 and 24 in read mode, and the memory 26 in write mode. These three states of memory are cycled in every three frame synchronizing periods. It should be noted, however, that the aforementioned procedure is merely an example, and the transition from read mode to write mode does not necessarily occur at each synchronizing signal, but it depends on the degree of jitter of the recording apparatus and the capacity of memory. For example, the mode setup operation may take place at other frame intervals such as 2-frame or 3-frame intervals.

One frame of data is written in the memory which has been set to write mode, and this memory is set to read mode for a 2-frame period in response to the subsequent frame synchronizing signal. In the read mode, the memory is read out using the above-mentioned reference clock. The reference clock is derived from a high frequency signal with extremely high frequency stability generated by use of a crystal oscillation element. Accordingly, the timing variation of the reference clock is extremely small.

Upon completion of writing, one frame of data which has been written previously is read out with a delay of $\frac{1}{2}$ to $1+\frac{1}{2}$ frames so that the reading will complete $\frac{1}{2}$ frame in advance of the next writing. Namely, by use of three memories in parallel for each track, the timing variation can be corrected with a margin of $\frac{1}{2}$ frame against jitter.

In the conventional circuit arrangement as described above, a plurality (generally three or more) of memories for the correction of timing variation are needed for each track. The number of memories needed is further increased by N-fold when the apparatus is designed for multi-track capability. This results in an expanded circuit arrangement, precluding the objectives of compactness, low power dissipation and cost reduction of the apparatus.

DISCLOSURE OF THE INVENTION

The present invention contemplates to provide a digital signal reproducing apparatus for recording and reproducing digital signals in frame units on a plurality of tracks. The apparatus is arranged for correcting the timing variation of reproduced signals in such a way that memory addressing for write operation is synchronized with the reference clock with extremely small timing variation (having a frequency 2AN times the reproduced data transmission clock fc, where A is a rational number larger than or equal to 1, and N is the number of tracks); among signals of each track demodulated by the demodulator, a signal to be written is selected by the write track selector; the signal selected by the track selector is memorized in the memory, with the timing of writing being determined by the write timing setup circuit; the timing of reading out a signal memorized in the memory is determined by the reading setup circuit so that the signal is read out during a period determined by the write timing setup circuit, and the signal to be read out is determined; one of writing or reading for the memory is specified selectively by the read/write selector in accordance with the output signals from the write timing setup circuit and reading setup circuit; and writing or reading is carried out at every 1/2ANfc cycle.

According to this invention, a common memory is used for the correction of timing variation, whereby the circuit arrangement can be simplified.

BRIEF DESCRIPTION OF THE DRAWINGS

FIGS. 5 (a–n) and 6 (a–c) are timing charts showing the operation of the apparatus shown in FIG. 4.

DESCRIPTION OF THE PREFERRED EMBODIMENT OF THE INVENTION

Figure 1:
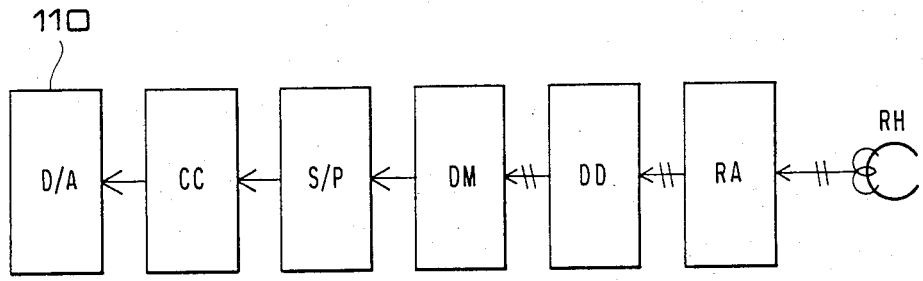
FIG. 1 is a block diagram showing a general system including a digital signal reproducing apparatus.
Figure 2:
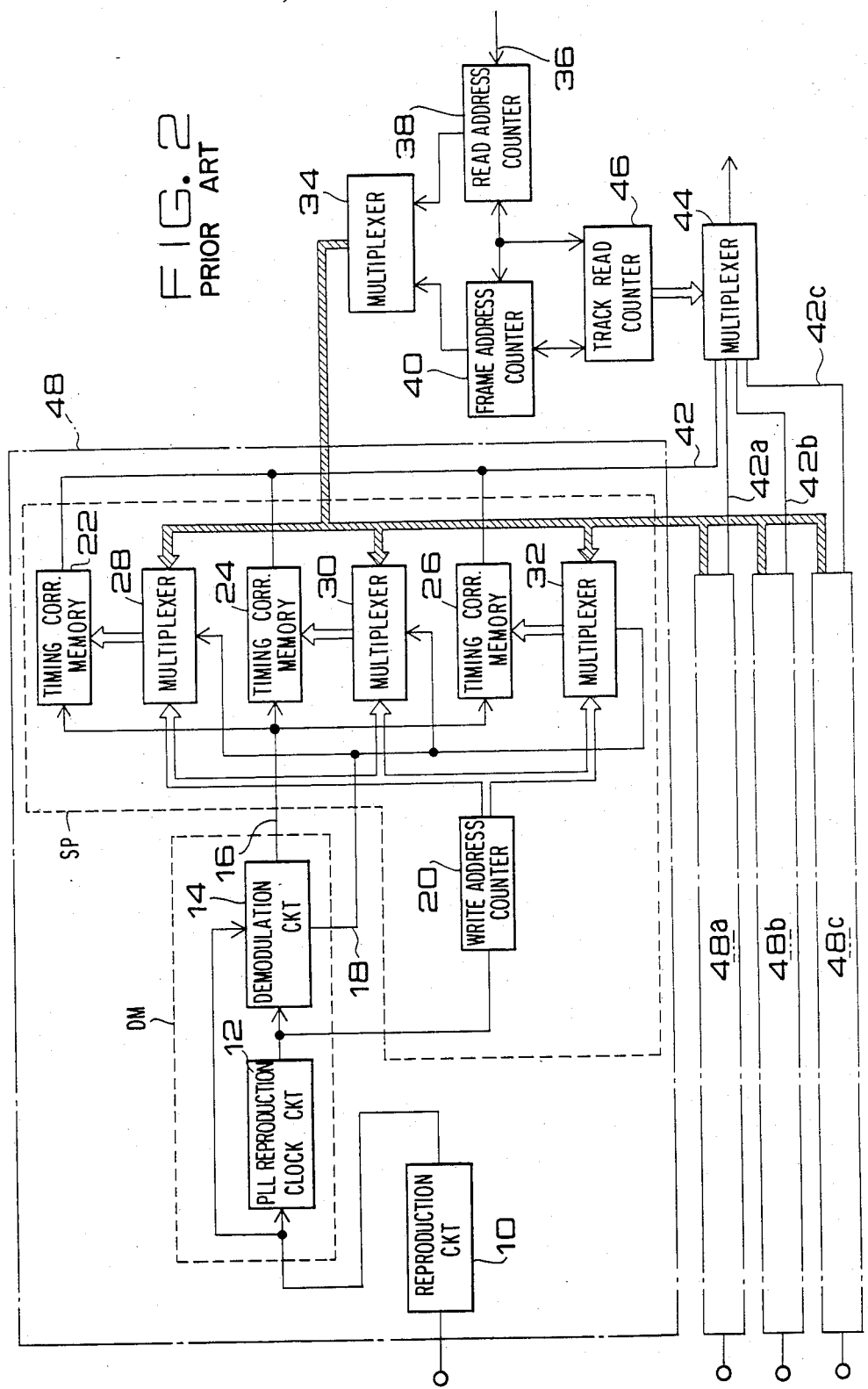
FIG. 2 is a block diagram showing an example of the conventional digital signal reproducing apparatus.
Figure 3:
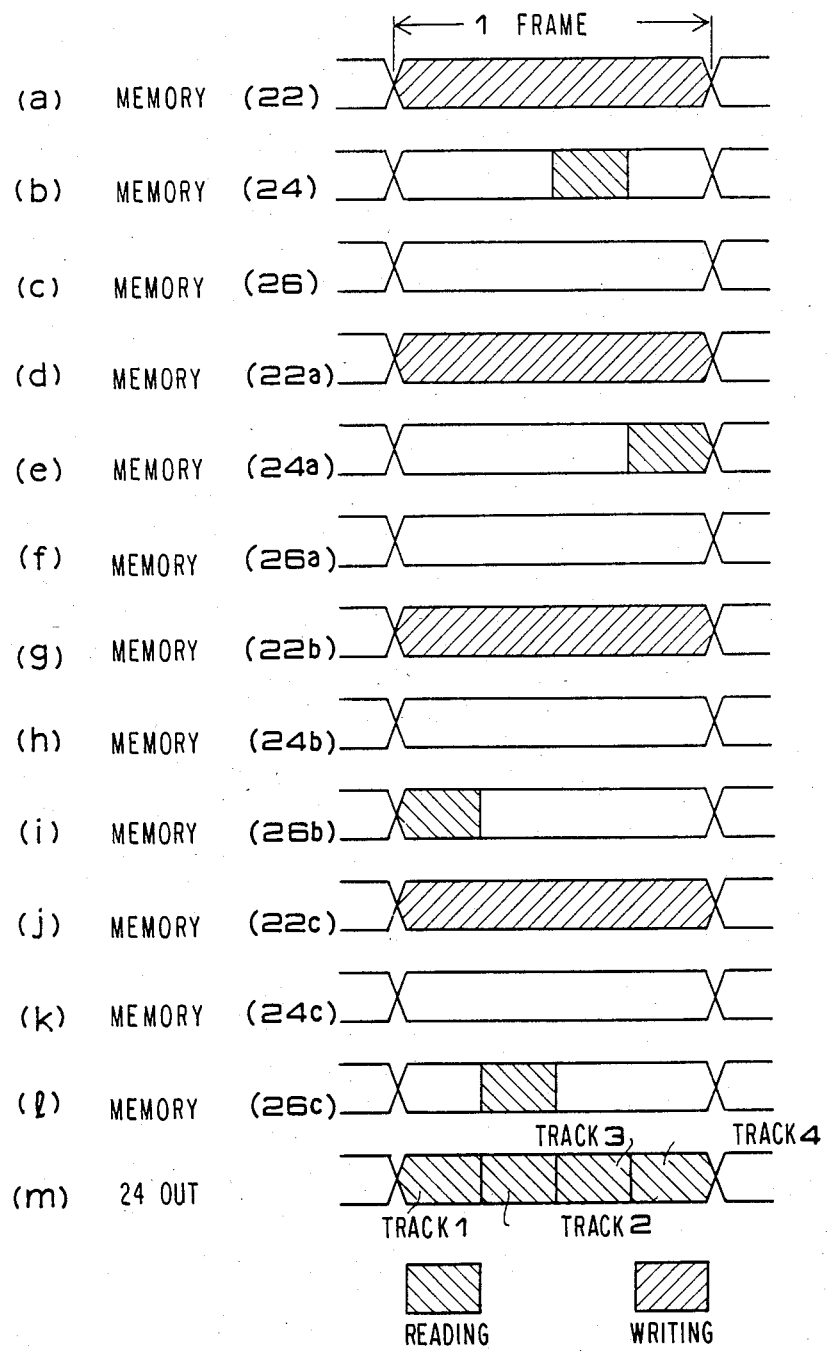
FIGS. 3 (a–m) is a timing chart showing the operation of the apparatus shown in FIG. 2.
Figure 4:
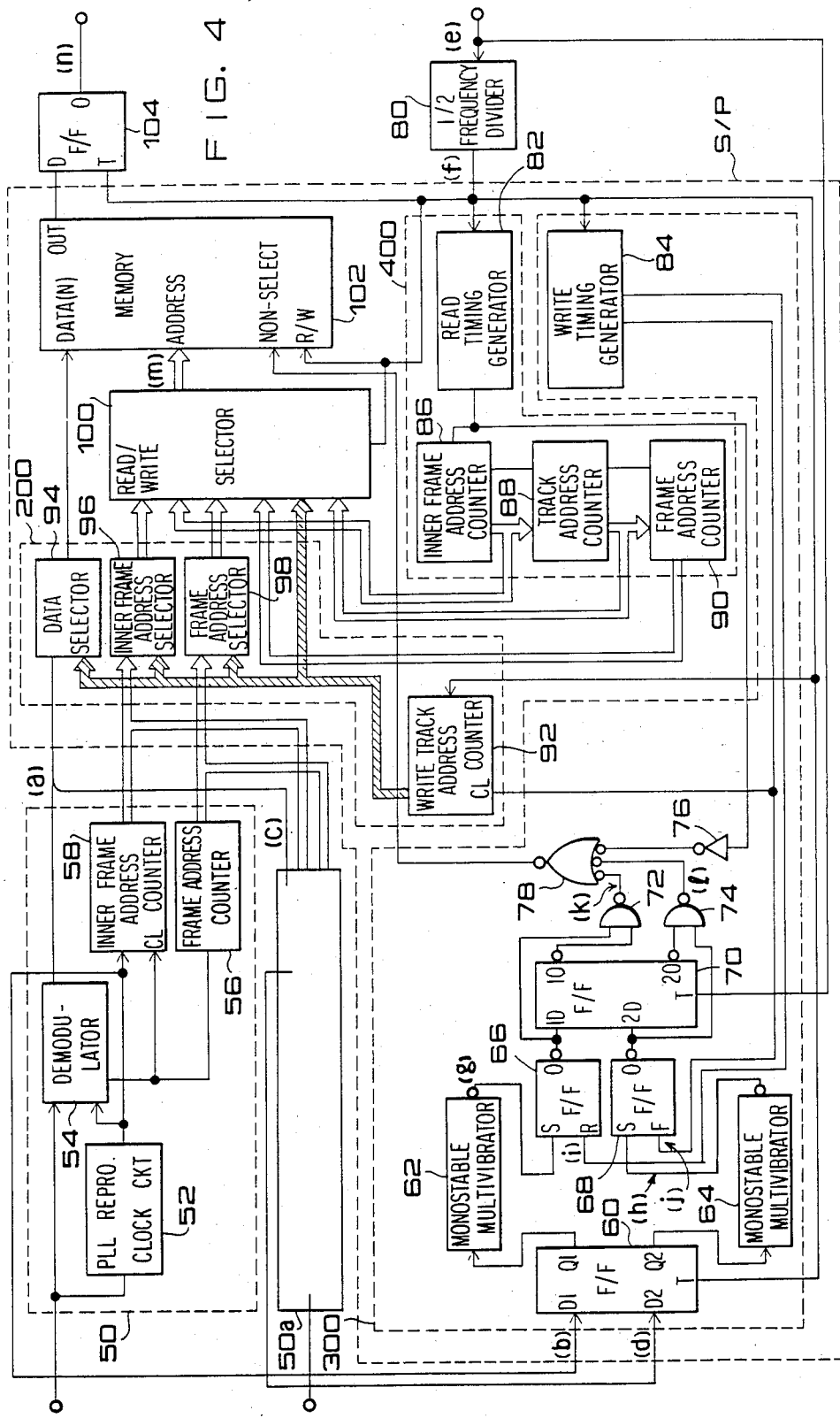
FIG. 4 is a block diagram showing an embodiment of the digital signal reproducing apparatus according to this invention.

In FIG. 4 showing an embodiment of the present invention, the signal reproduced by a magnetic head or the like is fed as a digital signal to a demodulator 50. The demodulator 50 includes a PLL (Phase Locked Loop) 52, a demodulator 54, a frame address counter 56, and an inner frame address counter 58.

The PLL 52 produces a clock which is in synchronism with the reproduced input signal, and the demodulator 54 transforms the input signal into binary data. The demodulator 54 further operates to detect in the input signal the frame synchronizing signal, which is fed to the reset terminal of the frame address counter 56 and inner frame address counter 58. These counters 56 and 58 are used to produce address data as will be described later. The aforementioned set of components referred to by numerals 52 through 58 is provided for each track separately as shown by blocks 50 and 50a.

A transmission clock in fc (Hz) generated by the PLL 52 for each track is fed to a write timing setting circuit 200 which generates the timing of writing. The write timing setting circuit 300 is made up of a flip-flop 60, monostable multivibrators 62 and 64, flip-flops 66, 68 and 70, logical gates 72, 74, 76 and 78, and a write timing clock generator 84, hereinafter referred to as a write timing generator.

On the other hand, a reference clock in 2ANfc (Hz) with extremely small timing variation is fed to a ½ frequency divider 80, by which the write/read time is set. The output of the frequency divider 80 is fed to a read timing generator 82 and write timing generator 84 for generating the read and write clocks, respectively. The output of the read timing generator 82 is fed to an inner frame address counter 86, while the output of the write timing generator 84 is fed to the reset terminal of RS flip-flops 66 and 68, which produce the inter-track write timing in response to the output of the write timing generator 84 and the transmission clock fc.

The output of the write timing generator 84 is also fed to the reset terminal of a write track address counter 92, which provides the output to the select input terminal of a data selector 94, inner frame address selector 96 and frame address selector 98. The write track address counter 92, data selector 94, inner frame address selector 96 and frame address selector 98 in combination constitute a write track selection circuit 200. The inner frame address selector 96 and frame address selector 98 also receive the outputs of the inner frame address counter 58 and frame address counter 56, respectively. The output of the write track address counter 92 is fed together with the selection outputs of the inner frame address selector 96 and frame address selector 98 to a read/write selector 100 so that it addresses a write track. The read/write selector 100 also receives the outputs of the inner frame address counter 86, track address counter 88 and frame address counter 90. The read timing generator 82, inner frame address counter 86, track address counter 88 and frame address counter 90 in combination constitute a read setting circuit 400.

The read/write mode is specified by the clock provided by the ½ frequency divider 80. Memory 102 has address terminals which receive the write address or read address with the specification of track. Data read out from the memory 102 in response to the read/write mode specification is timed by the flip-flop 104 and fed as continuous data to a CRC check circuit or the like.

The foregoing circuit arrangement enables the write operation which is in synchronism with the read operation, whereby the timing variation of data can be corrected using a single memory which is shared by all tracks.

Next, the operation of the invention apparatus will be described. First, in the conventional system, the write address and read address are not specified in synchronism with each other. Therefore, attempts to read and write data for a single memory at each data transmission timing, or to process several tracks on a multiplex basis within a period of data transmission using a single memory can possibly lead to the occurrence of a read error or write error. On this account, a plurality of memories are provided in parallel for each track. In addition, a write-only region for write address specification in frame units by the PLL reproduction clock and a read-only region for read address specification by the clock without timing variation in consideration of a margin for jitter are provided.

Whereas, according to the present invention, write address specification is synchronized with read address specification, so that reading and writing for N tracks can be carried out at each read data transmission timing using a single memory. FIG. 5 shows an example of the operation. Symbols (a)–(n) in FIG. 5 are given to signals in correspondence to those of FIG. 4. Waveform (a) in FIG. 5 represents demodulated data from the circuit block 50 in FIG. 4. Waveform (b) is the transmission clock in the demodulated data, (c) is demodulated data from the circuit block 50a, and (d) is the transmission clock in data (c). Synchronization is established between data (a) and (b), and between (c) and (d). On the other hand, however, the clocks of (b) and (d) are produced from reproduced data of different tracks, and their frequencies cannot be always equal.

Waveform (e) represents a clock $f_{osc}$ with extremely small timing variation, and it is generated, for example, using a high stability crystal oscillation element. The clock $f_{osc}$ is, of course, out of synchronism with the above-mentioned clocks (b) and (d). Therefore, it is necessary for data to be synchronized with $f_{osc}$. For this purpose, the timings of reading and writing the memory, are determined on the basis of $f_{osc}$. Determination of the read and write timings is carried out by manipulating the read/write select input of the memory and the control input of the read/write selector with a clock [shown by (f) in FIG. 5] in ANfc (Hz) derived from $f_{osc}$ through ½ frequency division (where A represents a coefficient larger than 1, N is the number of tracks, and fc is the data transmission clock frequency in data recording and reproduction in multi-track mode). By this, the read time and write time are made consistent, i.e., 1/2ANfc (Hz). The period of reading is AN times that of the reproduced data transmission clock fc.

Next, in setting up write mode, the data transmission clock fc of each track is first synchronized with the timing clock shown by (f). Then, a clock with a pulse width shorter than 1/2ANfc is produced at every transmission timing [as shown by (g) and (h) in FIG. 5] and fed to the set terminal of the RS flip-flops 66 and 68. Alternatively, the write timing may be created in such a way that the flip-flop 60 is provided at its T input (f) with a clock in phase with the falling edge of (e) and its outputs $Q_1$ and $Q_2$ are fed to the clock terminal T of a D-type flip-flop 70 as clock pulses for latching data, instead of feeding them to the set terminal of the flip-flops 66 and 68. The transition of states created for determining the write timing of each track is coincident with the rising edge of write timing, and the clock with a period of 1/Afc (sec) is fed to the reset terminal of the flip-flops 66 and 68 as shown in (i) or (j) in FIG. 5. The outputs of the flip-flops 66 and 68 are fed to the gates 72 and 74 of the flip-flop 70, a write region of 1/2ANfc (sec) can be established with an A-fold margin once in a reproduced data transmission period [1/fc (sec)] for each track as shown by (k) and (l) in FIG. 5. In order that the write timing of each track does not coincide, the clock with a period of 1/Afc (sec) for determining the write timing of each track by being fed to the reset terminal of the RS flip-flop is out of phase by 1/ANfc (sec) with that of the adjacent track, as shown by (i) and (j) in FIG. 5.

Through the foregoing means, a write region in synchronism with the read timing is ensured.

Next, means for selecting tracks will be described. Each track has a data output in synchronism with the reproduced data transmission clock fc, output of inner frame address counter derived from fc, and output of the frame address counter derived from the frame synchronizing signal. These outputs are fed to the data selector, inner frame address selector and frame address selector, respectively. These selectors receive as the track selection input the output of the track address counter derived from the clock of ANfc. By using the clock of any one of the tracks for determining the write timing in a period of 1/Afc for resetting the track address counter, the count of N (the number of tracks) is reached A times within a period of 1/fc and this is in synchronism with the read/write switching for the memory. The selector output of writing is fed to the read/write selector, and entered to the read address counter and the address input of the memory alternately in synchronism with the memory read/write timing in response to the clock of ANfc.

The foregoing means enables reading of AN times within one data transmission period together with writing for N tracks with an A-fold margin on a multiplex basis using a single memory.

The reading and writing relationship for one frame of reproduced data is as shown in FIG. 5. For writing, 1/2ANfc (sec) is spent with a marginal factor of A within one reproduced data transmission period, and each reproduced data is written successively [See (a) of FIG. 6]. For reading, on the other hand, a jitter margin is taken into account, and data preceding by ½ frame or more is read out. Reading takes place AN times in one reproduced data transmission period, with a read inhibit period (A-1) times the reading period being provided, so that data of N tracks are read out [See (b) of FIG. 6]. In order to make the read-out data continuous, they are synchronized with the clock of ANfc [See (c) of FIG. 6].

It should be noted that the present invention is not limited to the embodiment shown in FIGS. 4, 5 and 6, but the arrangement can be made, for example, such that the read timing clock generator and write timing clock generator are modified slightly so that N data are read out continuously in the former (or latter) half of one data transmission period and N track data are written continuously in the latter (or former) half of the period on a divisional multiplex basis. Although in the foregoing embodiment the read timing is given in block units for each track, it is also possible to arrange so that N tracks of data are read out continuously.

I claim:

1. A digital signal reproducing apparatus for multiple-track signals comprising:

N demodulation means for demodulating N parallel track signals into N corresponding binary track signals wherein N is an integer greater than 1;

each of said N demodulation means including clock recovery means responsive to the respective track signal for generating a transmission clock signal of frequency fc in phase with its corresponding binary data signal, and further including input data address counting means responsive to sync signals in the respective track signal and responsive to the respective transmission clock signal for generating respective successive input data address signals;

system clock means for producing a reference clock signal of frequency ANfc wherein A is a rational number equal to or larger than 1, and each cycle of the reference clock signal defines a read phase and a write phase;

a single memory unit having a plurality of address inputs, a data input, a data output, a chip select input, and a read/write select input connected to the system clock means for being driven into read and write modes in correspondence with the read and write phases of the reference clock signal;

write selection means including (1) write track counting means connected to the system clock means for generating N successive write track addresses on write track address outputs therein in synchronism with successive cycles of the reference clock signal, (2) data selection means operated by the write track address outputs for successively applying the binary track signals from the respective N demodulation means to the data input of the memory unit, and (3) write data address selection means operated by the write track address outputs for successively applying the input data address signals from the respective N demodulation means to write data address outputs thereof;

read address selection means connected to the system clock means and including read track counting means and read data address counting means for generating successive read address signals on read address outputs thereof in synchronism with successive cycles of the reference clock signal;

read/write address selection means operated by the system clock means for alternately connecting first inputs from the read address outputs of the read address selection means and second inputs from the write data address outputs and the write track address outputs of the write selection means to the address inputs of the memory input in synchronism with the read and write phases of the reference clock signal;

write timing set up means including write timing means connected to the system clock means for generating successive spaced write timing pulses on N outputs thereof in synchronism with write phases of the reference clock signal, and further including N enablement means having inputs connected to the respective clock recovery means of the N demodulation means and to the respective N outputs of the write timing means for producing respective memory chip selection pulses upon coincidence of ordinary data signals in the corresponding demodulation means with the corresponding write timing pulses;

read timing means connected to the system clock means for generating successive read timing pulses in synchronism with the read phases of the reference clock signal; and OR means for applying the chip selection pulses and the read timing pulses to the chip select input of the memory unit generating on the data output thereof a series digital data signal corresponding to the N parallel track signals.

* * * * *